UNITED STATES PATENT OFFICE.

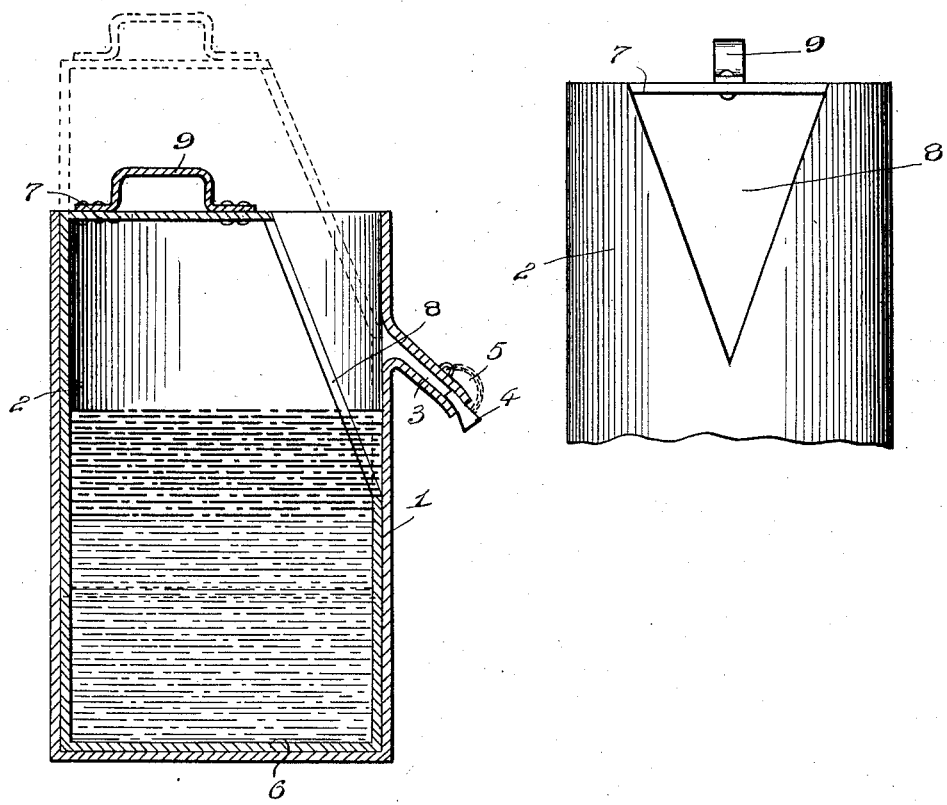

FRANK PETERSON, OF LEADVILLE, COLORADO.

CREAM-SEPARATOR.

1,063,059.  Specification of Letters Patent.  Patented May 27, 1913.

Application filed September 17, 1912. Serial No. 720,832.

*To all whom it may concern:*

Be it known that I, FRANK PETERSON, a citizen of the United States, residing at Leadville, in the county of Lake and State of Colorado, have invented new and useful Improvements in Cream-Separators, of which the following is a specification.

This invention is an improved cream separator and consists in the construction, combination and arrangement of devices hereinafter described and claimed.

The object of my invention is to provide an improved cream separator which is extremely cheap and simple, is very strong and durable, which may be readily cleansed and which may be readily operated to separate cream from milk.

In the accompanying drawing:—Figure 1 is a vertical central sectional view of a cream separator constructed in accordance with my invention, showing the inner vessel in lowered position in full lines and in raised position in dotted lines. Fig. 2 is a detail front elevation of the upper portion of the inner vessel.

In accordance with my invention, I provide an outer vessel 1 and an inner vessel 2 which are preferably cylindrical in form as here shown and are also preferably made of sheet metal. The outer vessel is open at its upper end and is provided on one side near its upper end with a spout 3. A plug 4 is here shown provided for the spout and connected thereto by a chain 5 to prevent the plug from being lost. The inner vessel 2 is closed at its bottom as at 6 and is also closed at the top as at 7. The inner vessel is of a slightly less diameter than the outer vessel so that it is adapted to fit snugly and to be raised and lowered therein. On one side of the inner vessel at and extending downwardly from the top thereof is a V-shaped opening 8 which is arranged opposite the inner end of the spout 3. This opening is of suitable depth. The inner vessel is provided on its top with a suitable handle, such as indicated at 9.

In the operation of my improved cream separator, when the inner vessel is in the outer vessel and the milk has been placed in the inner vessel, the latter rests upon the bottom of the outer vessel and is in lowered position and permitted to remain in said position until after the cream has collected on the top of the body of milk. The plug is then taken out of the spout and the inner vessel is raised a sufficient distance to cause all of the cream to be drawn off from the milk and discharged through the spout. Any suitable vessel may be employed to receive the cream discharged from the spout. When the device is in initial position with the inner vessel in the bottom of the outer vessel, the level of the milk is somewhat below the inner end of the spout. But, when the inner vessel is raised, as hereinbefore described, the opening 8 permits the cream to flow from the inner vessel through the spout, as stated.

I claim:—

1. A cream separator comprising an outer vessel having a discharge spout near its upper end and an inner vessel movable vertically in the outer vessel, and having an opening in one side to permit cream to flow therethrough, and through the spout when the inner vessel is raised.

2. The herein described cream separator comprising an outer vessel having a spout near its upper end and an inner vessel movable vertically in the outer vessel and having a V-shaped opening near its upper end and at one side and arranged opposite the inner end of the spout to permit the cream from the inner vessel to flow out through the spout when the inner vessel is raised.

In testimony whereof I affix my signature in presence of two witnesses.

FRANK PETERSON.

Witnesses:
 OLOF PETERSON,
 EDWARD S. KERMODE.

Copies of this patent may be obtained for five cents each, by addressing the "Commissioner of Patents Washington, D. C."